(12) United States Patent
Ogasawara et al.

(10) Patent No.: US 7,139,234 B2
(45) Date of Patent: Nov. 21, 2006

(54) OPTICAL PICKUP

(75) Inventors: Masakazu Ogasawara, Tsurugashima (JP); Ikuya Kikuchi, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 542 days.

(21) Appl. No.: 10/713,038

(22) Filed: Nov. 17, 2003

(65) Prior Publication Data
US 2004/0105374 A1    Jun. 3, 2004

(30) Foreign Application Priority Data
Nov. 19, 2002   (JP)   ............ P2002-334689

(51) Int. Cl.
*G11B 7/135*   (2006.01)

(52) U.S. Cl. ............ 369/112.02; 369/112.15; 369/112.17

(58) Field of Classification Search ........... 369/112.02, 369/112.15, 112.17
See application file for complete search history.

(56) References Cited

U.S. PATENT DOCUMENTS 5,793,735 A * 8/1998 Oono ............... 369/112.02
5,892,749 A * 4/1999 Yamanaka ............ 369/112.17
5,905,708 A * 5/1999 Richter ............... 369/94
5,917,798 A * 6/1999 Horimai et al. ............ 369/103

FOREIGN PATENT DOCUMENTS

JP   2002-150598   5/2002

* cited by examiner

*Primary Examiner*—Andrea Wellington
*Assistant Examiner*—Linh T. Nguyen
(74) *Attorney, Agent, or Firm*—Drinker Biddle & Reath LLP

(57) ABSTRACT

An optical pickup is provided for recording and reproduction of information onto and from an optical disk. In the optical disk, in a forward optical path, a single polarized optical beam is converted to plural polarized optical beams. Polarization modes of the plural polarized optical beams are then converted to a polarization mode suitable for one of the recording and the reproduction to produce polarization-converted optical beams and to radiate the polarization-converted optical beams to the disk. In the backward optical path, polarization modes of the polarization-converted optical beams reflected from the disk are returned to the same polarization mode as that of the plural polarized optical beams, so that plural polarized reflected optical beams are produced. Polarization modes of the plural polarized reflected optical beams are then returned to the same polarization mode as the single polarized optical mode.

11 Claims, 11 Drawing Sheets

PRIOR ART
[FORWARD OPTICAL PATH]

[BACKWARD OPTICAL PATH]

PRIOR ART
[FORWARD OPTICAL PATH]

[BACKWARD OPTICAL PATH]

OPTICAL PICKUP

BACKGROUND OF THE INVENTION

1. The Field of the Invention

The present invention relates to an optical pickup.

2. Description of the Related Art

In a conventional pickup, a quarter wavelength plate is disposed in an optical path to convert linearly polarized light to circularly polarized light to be transmitted toward an optical disk. In this optical configuration, a polarization direction in the backward optical path is different from that in the forward optical path by 90 degrees. Hence if an optical element, such as liquid crystal element, that has a dependency on a polarization characteristics in the incidence direction of light is used for correcting an aberration of light, making the optical element active (that is, the aberration correction is active) requires that the polarization direction in the forward or backward optical path should be consistent with the polarization characteristic of the optical element.

Conventional techniques for achieving the above have been provided as follows.

For example, a first conventional technique is shown in FIGS. 1A and 1B, in which a liquid crystal (LC) panel 1, quarter wavelength plate 2, objective lens 3 are disposed before an optical disk DK. The liquid crystal panel 1 is used as the optical element to correct an aberration caused in the optical path traveling in an optical pickup (refer to Japanese Patent Laid-open (KOKAI) No. 2002-150598). In this configuration of the optical pickup, the polarization direction in the forward optical path is consistent with the orientational direction of the liquid crystal, whereby a phase difference caused in the liquid crystal molecules of the liquid crystal panel 1 act on light flux traveling along the forward optical path.

A second conventional technique is shown in FIGS. 2A and 2B, where, in addition to the liquid crystal panel 1, there is provided a liquid crystal panel 4 whose orientational direction is consistent with the polarization direction in the backward optical path.

A third conventional technique is shown in FIGS. 3A and 3B, where there is provided a liquid crystal panel 1 that is designed to act on both the forward and backward optical paths. In this configuration, if linearly polarized light is obtained on the disk DK, there is no change in the polarized light in each of the forward and backward optical paths. Though disposed is only one liquid crystal panel 1, a phase difference caused by the liquid crystal molecules of the panel 1 will act on light flux in the forward and backward optical paths.

A fourth conventional technique is shown in FIGS. 4A, 4B, 5A and 5B, where there is provided an optical pickup compatible with a DVD and a high-density optical disk. A hologram lens 6 is added to an objective lens 3 used for the high-density optical disk. In the case of using this pickup as a compatible pickup for recording and reproducing bits of information on and from the DVD, a blue laser beam dedicated to the high-density optical disk is differentiated in the polarizing direction by 90 degrees from a red laser beam dedicated to the DVD, so that the polarizing hologram lens 6 will not act when the high-density optical disk is subjected to the recording and reproduction of information thereon or therefrom. In contrast, when bits of information are recorded and reproduced onto and from the DVD, the hologram 6 acts on the light.

However, the above various conventional techniques have still suffered from the various problems as follows.

The first conventional technique has used the quarter wavelength plate 2 to realize the circular polarized light on the surface of the disk DK. The polarized direction in the backward optical path is therefore obliged to be different from that in the forward direction by 90 degrees. The liquid crystal molecules in the liquid crystal plate 1 will not act on the light flux in the backward optical path, thereby leaving the aberration in the detection system. As a result, this influences undesirably the focus servo control and the tracking servo control, providing a deteriorated recording and reproduction characteristic to the optical pickup.

The second conventional technique has used the two liquid crystal plates 1 and 4. Hence a production cost of the optical pickup increases. In addition, it has been required to adopt a higher technical control for minimizing a relative positional shift between the two liquid crystal panels.

In the case of the third conventional technique, no aberration is supplied to the detection system. However, the light on the surface of the disk DK becomes linear polarized light. The performance of recording and reproducing information is therefore apt to be sensitive to the structure of an optical disk, such as depths of pits and depths and shapes of grooves. This leads to the problem that the stability of the recording and reproducing performance tends to deteriorate. Various standards for disks are specified with regard to only disks directed to the circular polarized light. If an optical pickup based on the linear polarized light is used, there arises a problem that an optical disk to be targeted will not operate as expected on the specifications thereof.

Still, the fourth conventional technique requires that the hologram lens 6 act on the light in the forward and backward optical paths in cases where the DVD is subjected to recording and reproducing bits of information. This causes the light on the disk DK to have linear polarization, thus having the same problem as that described about the third conventional technique.

As described above, in cases where the optical pickup employs an optical element (such as liquid crystal (LC) panel and hologram lens) having dependency on the polarization and the optical element is desired to act on the light in both the forward and backward optical paths, the linear polarized light is created on the disk. In consequence, the structures of an optical disk have influence largely upon the recording and reproducing characteristics of the optical pickup, thus deteriorating its playability.

In addition, if it is desired to realize the circular polarized light on the disk, the polarization-dependent element will not act on the light in the forward optical path, because the polarizing direction in the backward optical path differs from that in the forward optical direction by 90 degrees. This requires that both optical elements be arranged, respectively, for the forward and backward optical paths.

SUMMARY OF THE INVENTION

An object of the present invention is to provide, with due consideration to the difficulties of the above conventional techniques, an optical pickup capable of sustaining a higher playability and enabling an optical element dependent on the polarization to function at its best with a production cost of the optical pickup.

According to one aspect of the present invention, there is provided an optical pickup for performing at least one of recording and reproduction of bits of information onto and from an information recording medium by using a single polarized optical beam having a single polarizing direction, comprising: a polarization converting unit configured to convert the single polarized optical beam to plural polarized optical beams having a plurality of polarizing directions; a converting and radiating unit configured to convert polarization modes of the plural polarized optical beams to a polarization mode suitable for one of the recording and the reproduction to produce polarization-converted optical beams, every polarizing direction, and to radiate the polarization-converted optical beams to the information recording medium; a mode returning unit configured to return polarization modes of the polarization-converted optical beams reflected from the information recording medium, to the same polarization mode as that of the plural polarized optical beams and to produce plural polarized reflected optical beams; and a polarization returning unit configured to return polarization modes of the plural polarized reflected optical beams to the same polarization mode as the single polarized optical mode.

BRIEF DESCRIPTION OF THE DRAWINGS

Other objects and aspects of the present invention will become apparent from the following description of embodiments with reference to the accompanying drawings in which:

FIGS. 11A and 1B illustrate the operations of an optical pickup according to a modification of the second embodiment.

DETAILED DESCRIPTION OF PREFERRED EMBODIMENTS

Preferred embodiments of an optical pickup according to the present invention will now be described hereinafter with reference to the accompanying drawings.

The following embodiments will be explained about an optical pickup to which the present invention is applied. In the optical pickup, an optical beam is radiated toward a DVD (Digital Versatile Disc) serving as an information recording medium so that bits of information is recorded on or reproduced from the DVD.

(First Embodiment)

Figure 1A:
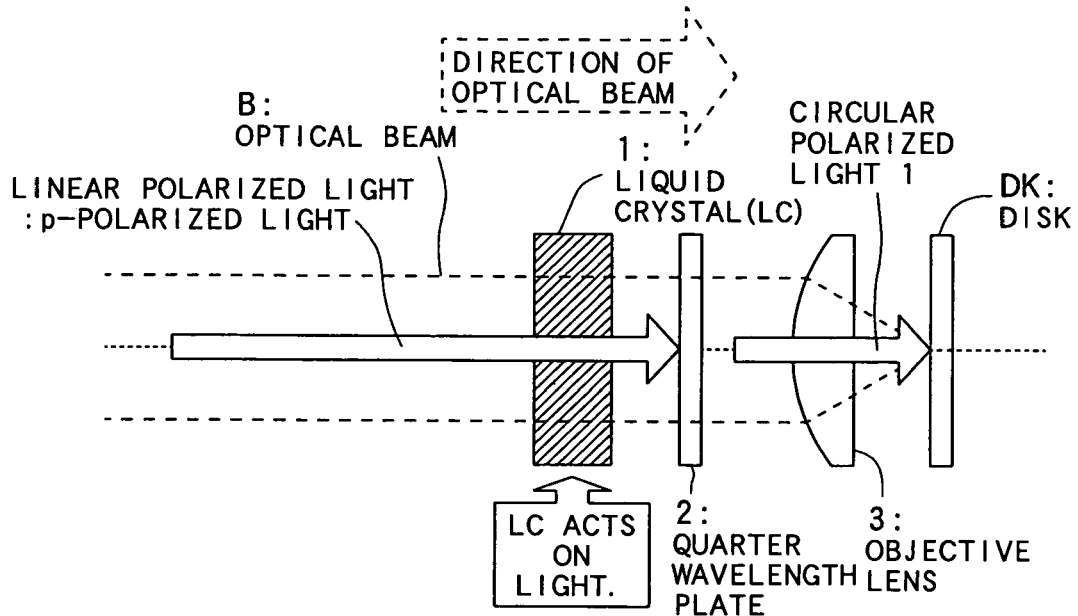
FIGS. 1A and 1B illustrate the operations of a first conventional optical pickup.
Figure 1B:
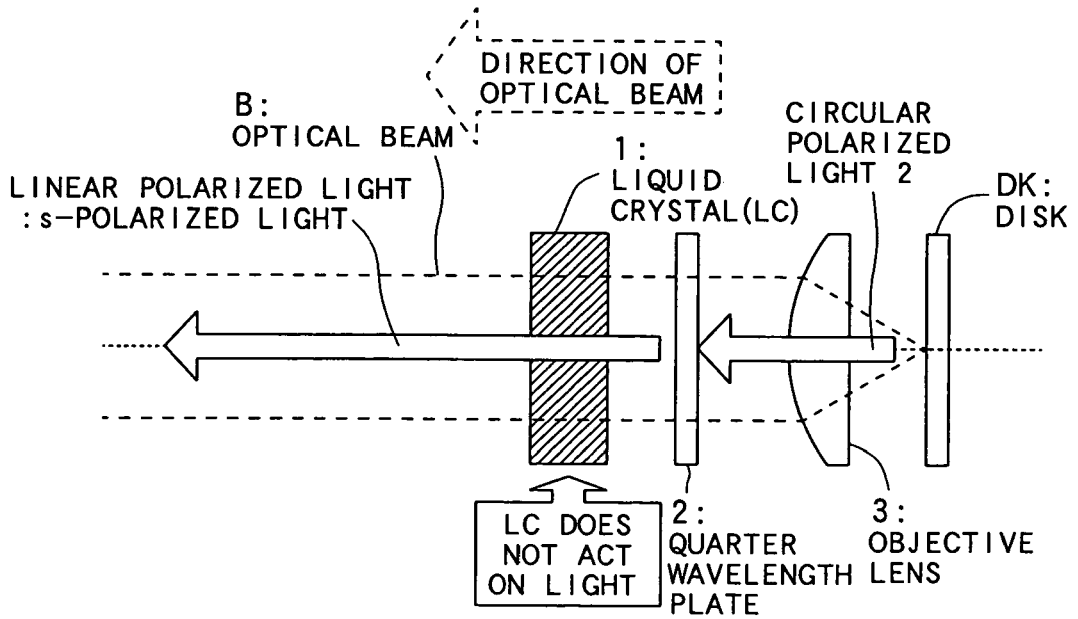
Figure 2A:
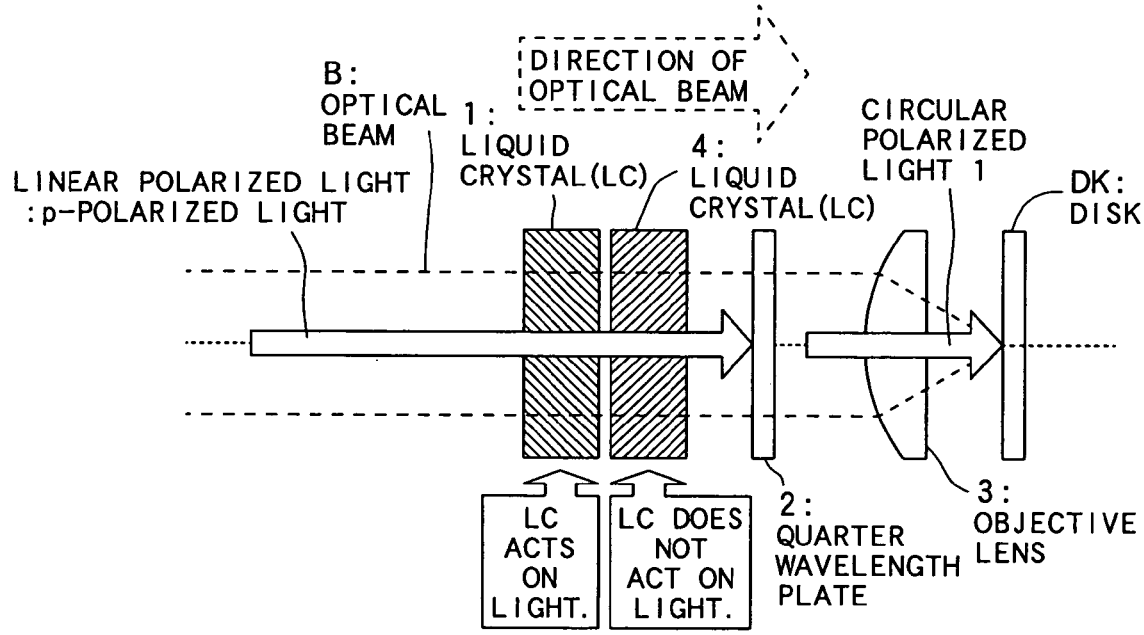
FIGS. 2A and 2B illustrate the operations of a second conventional optical pickup.
Figure 2B:
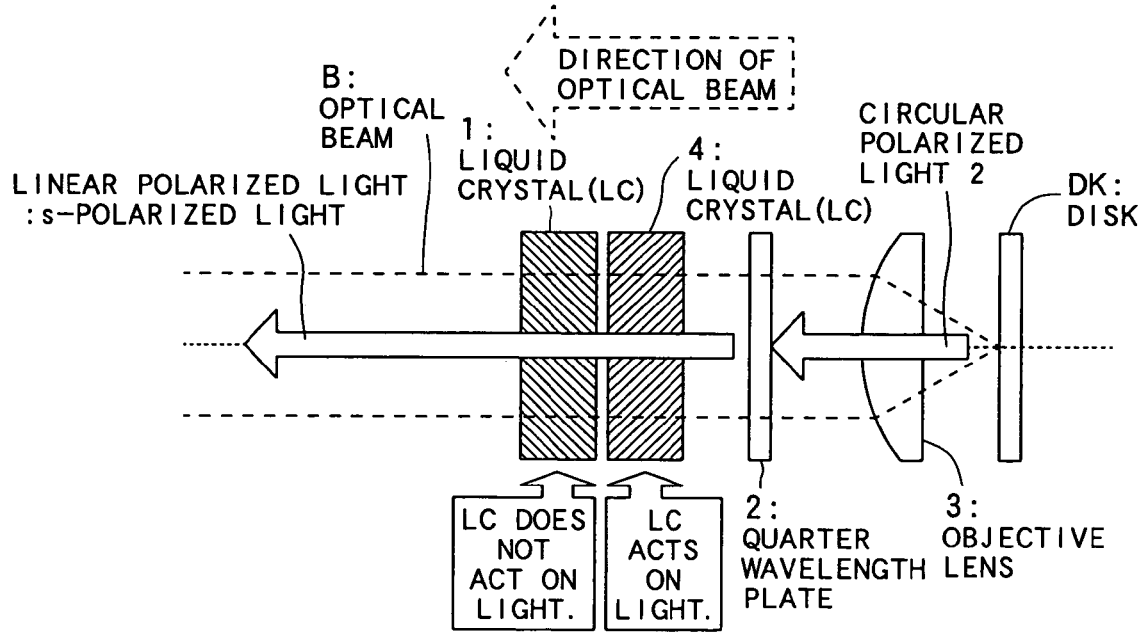
Figure 3A:
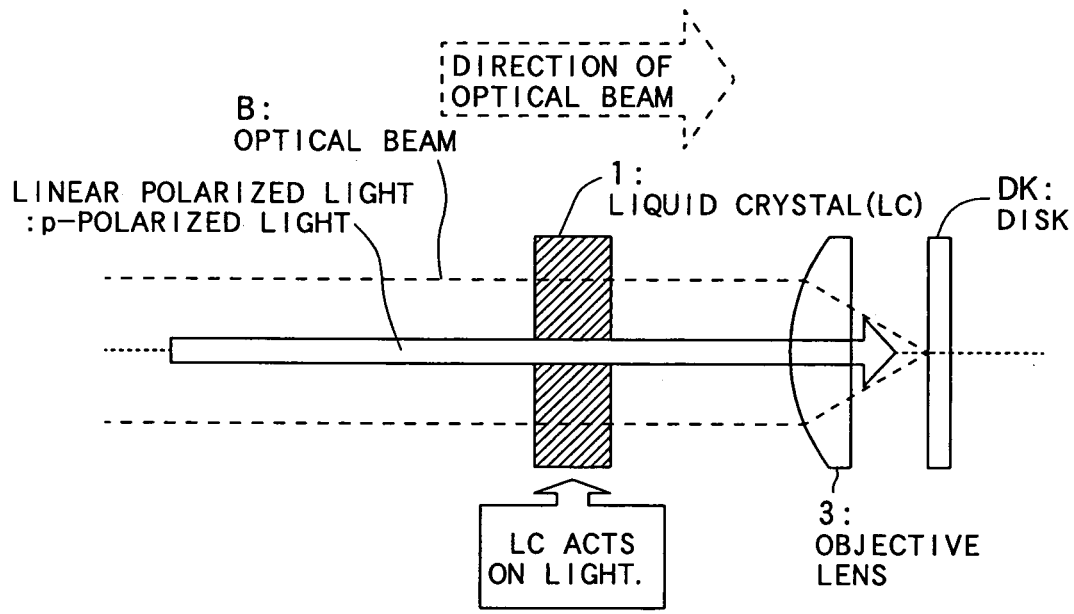
FIGS. 3A and 3B illustrate the operations of a third conventional optical pickup.
Figure 3B:
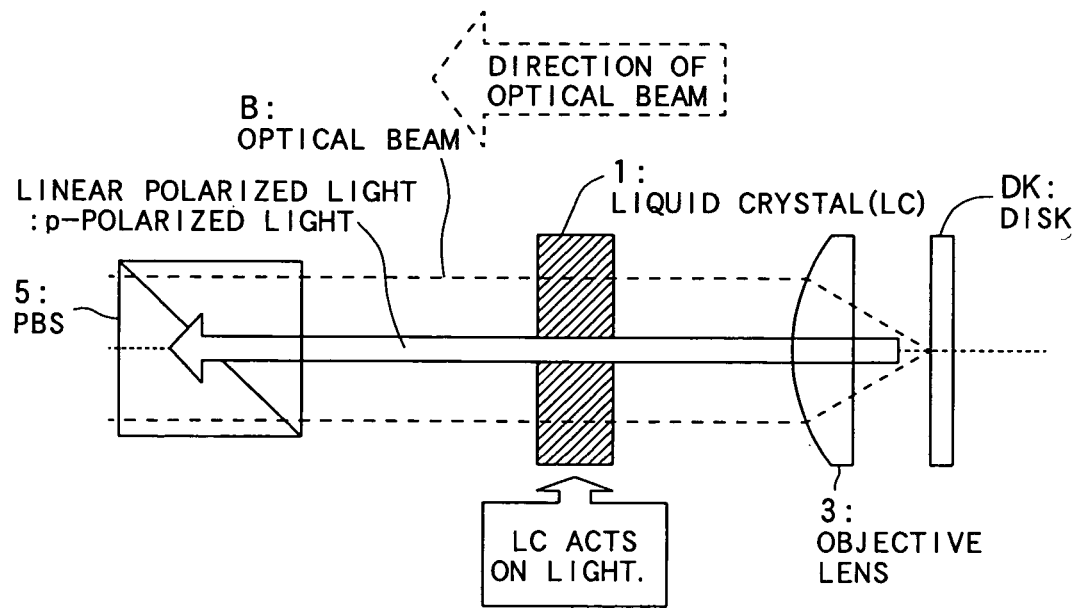
Figure 4A:
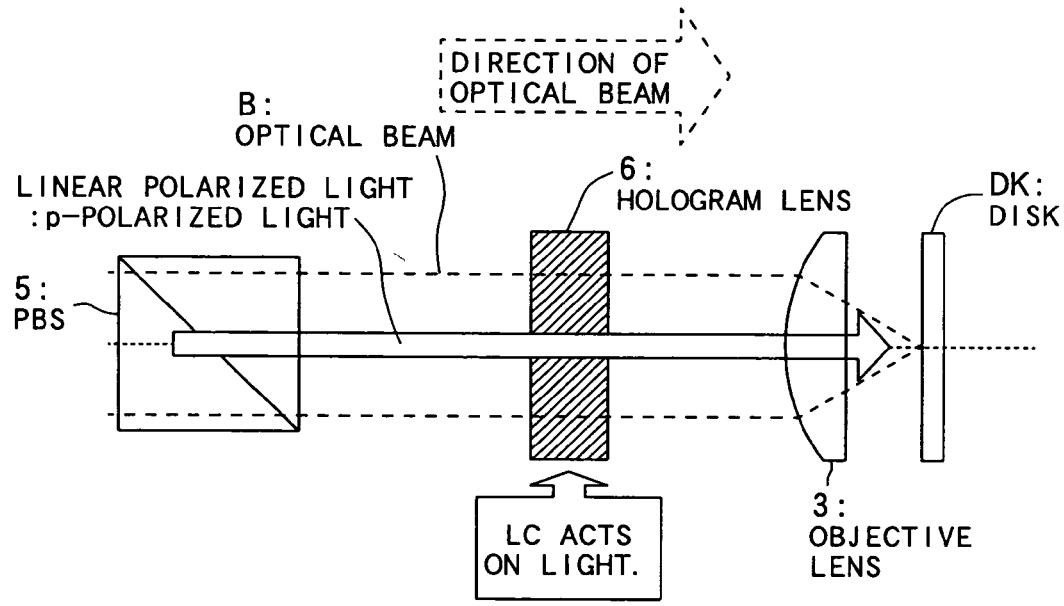
FIGS. 4A and 4B illustrate the operations of a fourth conventional optical pickup.
Figure 4B:
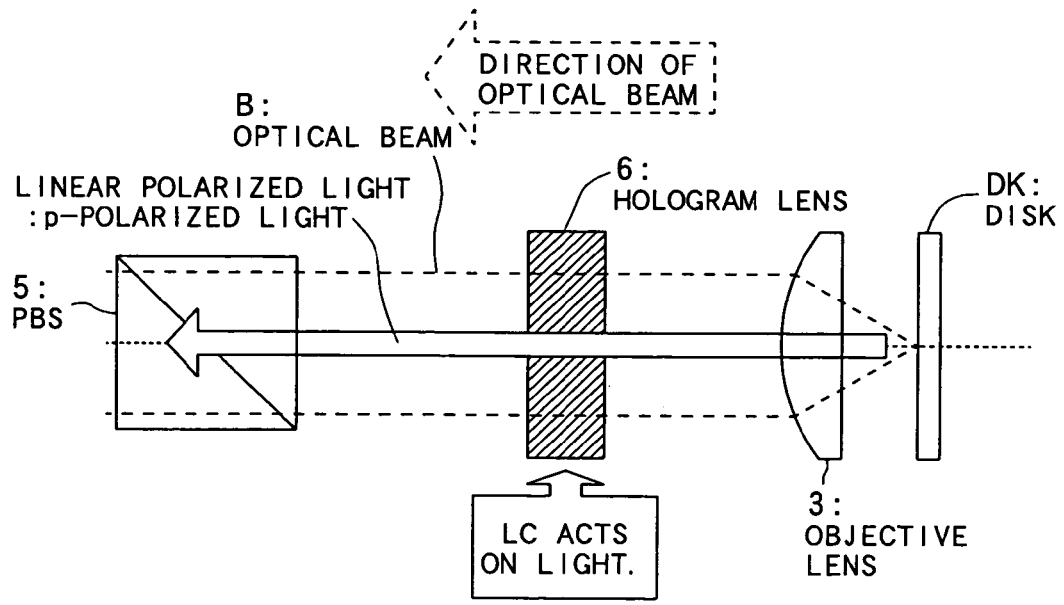
Figure 5A:
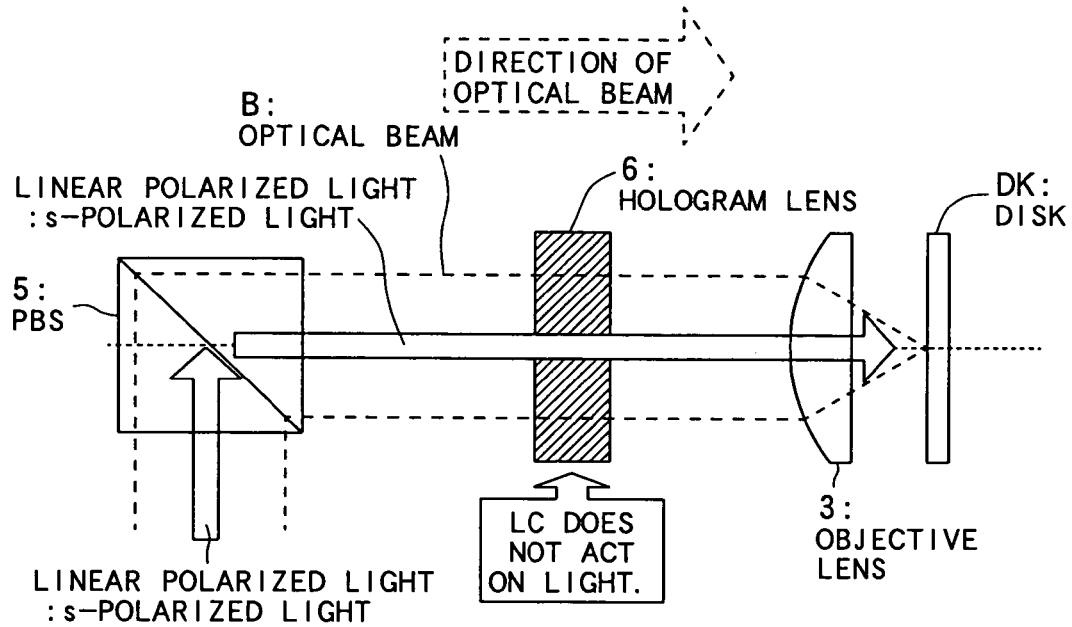
FIGS. 5A and 5B illustrate the operations of the fourth conventional optical pickup.
Figure 5B:
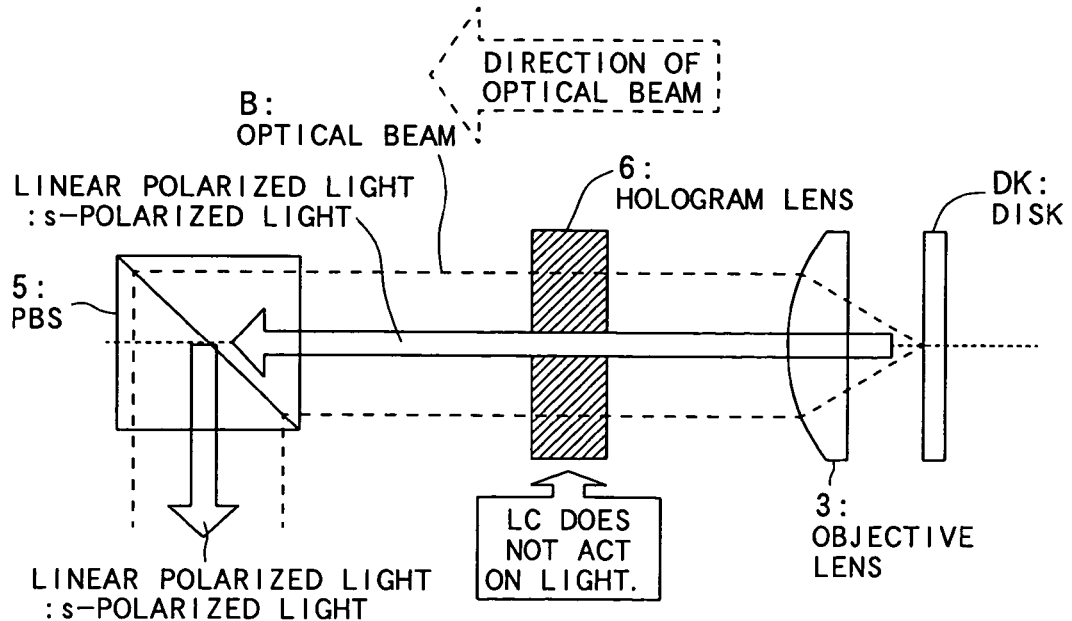
Figure 6:
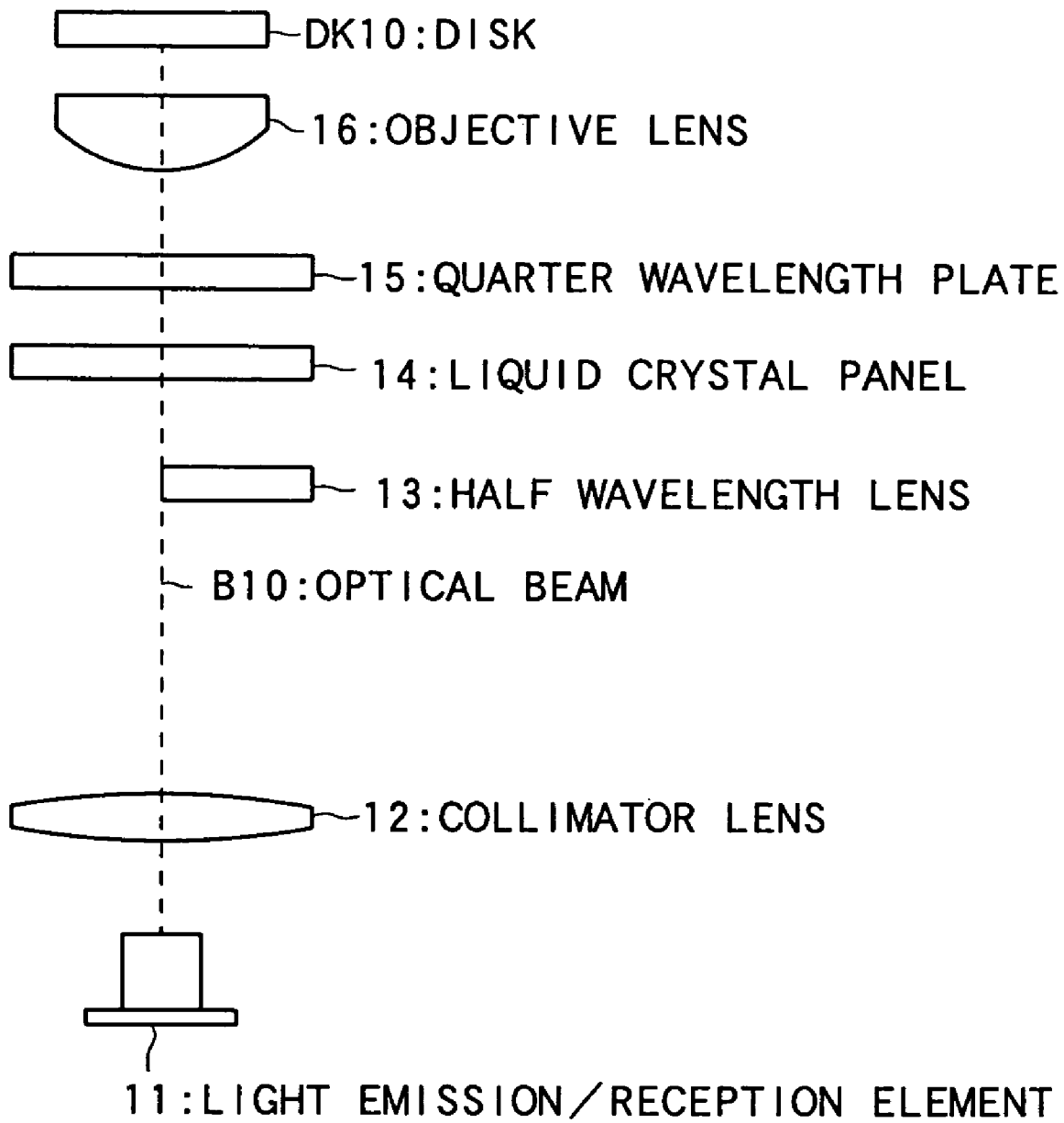
FIG. 6 shows the optical configuration of an optical pickup according to a first embodiment of the present invention.

A first embodiment will now be described with reference to FIG. 6, in which the configuration of an optical pickup according to the first embodiment is shown. FIG. 6 shows the configuration of the pickup, together with an optical disk DK10 serving as an information recording medium.

The optical pickup DK 10, which is subjected to recording and reproduction of information, is formed into a layered structure on a substrate of a thickness of 0.6 mm, for example. The layered structure includes a recording layer into which information signals are recorded based on phase changes. The recording and reproduction is performed by making light enter the substrate from the back side thereof.

As shown in FIG. 6, the optical pickup according to the present embodiment is provided with a light emission/reception element 11, collimator lens 12, half wavelength plate 13 functioning as polarization converting means and polarization returning means, liquid crystal (LC) panel 14 functioning as polarization acting means and aberration correcting means, quarter wavelength plate 15 functioning as converting and radiating means and mode returning means, and objective lens 16.

With references FIGS. 6 and 7A to 7C, the operations of this optical pickup will now be explained in terms of optical beams in forward and backward optical path. Incidentally, the "forward optical beam" is defined as being an incoming optical beam from the element 11 to the disk DK 10, while the "backward optical beam" is defined as being an optical beam reflected from the disk DK10.

The light emission/reception element 11 radiates an optical beam B10 formed into, for example, a single polarized optical beam having a single polarizing direction (red-color beam, wavelength $\lambda$=650 nm). The optical beam B10 radiated from the light emission/reception element 11 enters the collimator lens 12, where the optical beam B10 is converted to parallel light, which is then made to enter the half wavelength plate 13.

Figure 7A:
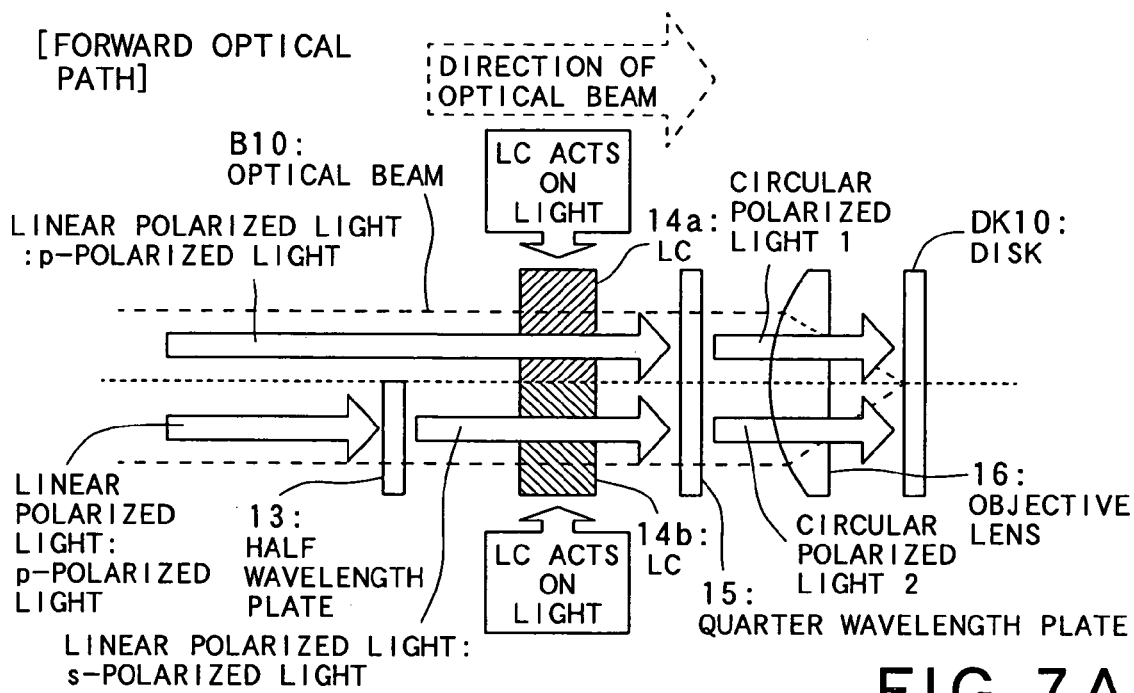
FIGS. 7A to 7C illustrate the operations of the optical pickup in the first embodiment.
Figure 7B:
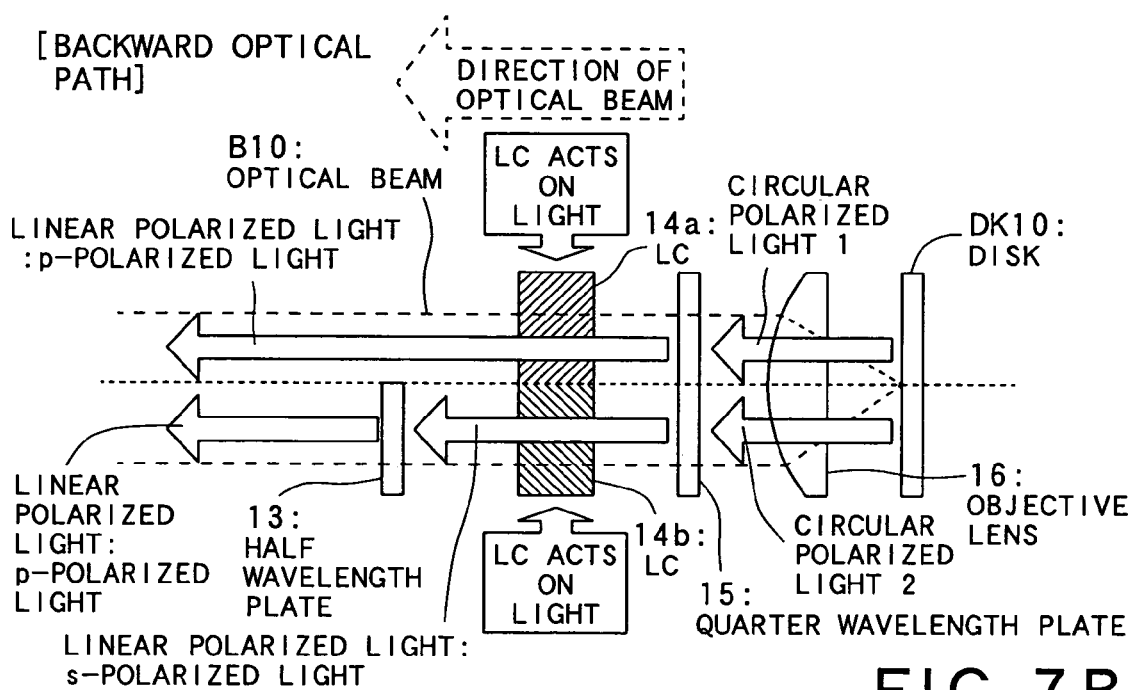
Figure 7C:
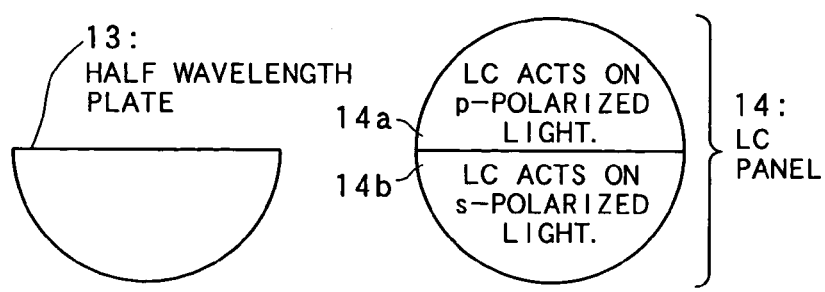

As shown in FIG. 7C, the half wavelength plate 13 is formed into a semicircular plate and is able to produce light flux of which polarizing direction differs form the incident light by 90 degrees, compared to that passing its semicircular portion serving as a first half portion. If an assumption is made such that the incident light to the half wavelength plate 13 is linear polarized light and its polarization is p-polarized light (a first linear polarized light; a further linear polarized light whose polarizing direction is orthogonal to that of the p-polarized light is s-polarized light serving as a second linear polarized light), the panel 13 will work as follows. Of the light flux of the optical beam B10, the half semicircular portion of light flux which passes the half wavelength plate 13 is converted to p-polarized light thanks to the plate 13 itself, whilst the remaining half semicircular portion of light flux (i.e., a second half portion) which does not pass the half wavelength plate 13 is kept as being the p-polarized light. Accordingly, the different two types of light fluxes then enter the liquid crystal panel 14 in the form of plural polarized optical beams.

The liquid crystal panel 14 has a transparent electrode which is for example divided into plural predetermined small areas such as grid-like areas. Controlling voltage to be applied to each of the divided areas makes it possible to change a refraction index at each divided area, thus giving a phase difference to a light ray passing each divided area, thus correcting an aberration, such as coma aberration and spherical aberration of the objective lens 16. In the liquid crystal panel 14, the transparent electrode is formed on the inner surface of a transparent glass substrate by evaporating a metal material such as ITO (Indium Tin Oxide). Inside the transparent electrode, there are formed orientational membranes to give a predetermined molecular orientation to liquid crystal molecules. Between the orientational membranes, a liquid crystal layer having a double refraction capability, for example, nematic liquid crystal is enclosed.

From a regional point of view, the liquid crystal panel 14 is composed of two liquid crystal regions: one liquid crystal region 14A serving as a first region and the other liquid crystal region 14B serving as a second region, the orientational directions in both the first and second regions being orthogonal to each other and the shape of each region corresponding to that of the half wavelength plate 13. In other words, as shown in FIG. 7C, the liquid crystal panel 14 is disposed such that, in the liquid crystal region 14A, its orientational direction acts on the p-polarized light, while in the liquid crystal region 14B, its orientational direction orthogonal to that in the region 14A acts on the s-polarized light.

In this way, since the liquid crystal region 14A has the orientational direction acting on the p-polarized light and the remaining liquid crystal region 14B has the orientational direction acting on the s-polarized light, the p-polarized light flux of the optical beam B10, which has entered the liquid crystal region 14A of the liquid crystal panel 14, receives the action of the liquid crystal region 14A. Likewise, the s-polarized light flux that has entered the other liquid crystal region 14B receives the action of the liquid crystal region 14B.

The optical beam B10, which has been given a desired phase distribution during a travel through the liquid crystal panel 14, then passes the quarter wavelength plate 15.

The quarter wavelength plate 15 has the function of converting linear polarized light to circular polarized light, so that the p-polarized light and s-polarized light are converted to circular polarized light "1" serving as first circular polarized light and circular polarized light "2" serving as second circular polarized light, respectively. The circular polarized light fluxes "1" and "2" are mutually different in their rotational directions (counterclockwise and clockwise).

The optical beam B10, which has been converted to the circular polarized light fluxes "1" and "2" so as to have the function of a polarization converting optical beam, is then fed to the objective lens 16 so that the beam is focused onto an information recording area in a face of the disk 10. In the case of using the ordinary parallel optical incidence, thereby may occur a spherical aberration to give rise to an obstacle to the formation of a preferable spot. In contrast, in the present embodiment, the liquid crystal regions 14A and 14B provide in advance the light with wave fronts for correcting the aberration, with the result that a preferable spot is formed on the disk DK10.

The reflection of the optical beam B10 on the information recording surface of the disk DK10 causes the rotational direction of the beam to be changed. When the light flux on the circular polarized light "1" comes to the disk DK10, reflected is the light flux on the circular polarized light "2." The opposite is true of the light flux on the circular polarized light "2." In this case, reflected is the light flux on the circular polarized light "1." In addition, the reflection is done such that the light fluxes of the optical beam B10 are reflected to point-symmetry regions about at an optical axis of the optical beam B10, which traveled through the point-symmetry regions in the forward optical path. Hence the polarizing directions of the optical beams across the quarter wavelength plate 15 in the forward and backward optical paths become the same.

A travel of the optical beam B10 through the quarter wavelength plate 15 causes the circular polarized light flux "1" to be converted to the linear p-polarized light and the circular polarized light flux "2" to be converted to the linear s-polarized light, whereby plural polarized-light reflected optical beams are supplied to the liquid crystal panel 14.

The p-polarized light flux enters the liquid crystal region 14A, whereas the s-polarized light flux enters the liquid crystal region 14B. The optical beam B10, which is composed of the light fluxes whose polarized directions are different from each other, will have actions of the liquid crystal regions 14A and 14B, respectively, even in the backward optical path. Practically, the liquid crystal regions 14A and 14B act so as to correct an aberration caused in the reflected optical beam B10. It is general that an aberration caused in the forward optical path from the light emission/reception element 11 (i.e, light source) to the quarter wavelength plate 15 and a further aberration caused in the backward optical path from the disk DK10 to the light emission/reception element 11 (i.e., receiver) are equal to each other. Accordingly, it is unnecessary to change an amount to be controlled at the liquid crystal regions 14A and 14B in correcting the aberrations in the forward and backward optical paths.

Of the optical beam B10 that has transmitted the liquid crystal panel 14, the s-polarized light flux that has transmitted the liquid crystal region 14B then passes the half wavelength plate 13, thus being converted to p-polarized light. It is therefore possible that the optical beam B10, whose polarized light fluxes have been different from each other in their polarized states until that moment, is all unified to the p-polarized light at this final optical stage. This unified p-polarized light then passes the collimator lens 12, whereby the light is focused onto a not-shown detector of the light emission/reception element 11.

As described above, an optical spot formed by the optical beam B10 on the disk DK10 is given by the circular polarization, so that it is avoidable that the recording and reproduction characteristic is largely dependent on the disk structures or others. A preferable playability can therefore be obtained.

Furthermore, the half wavelength plate 13 converts the optical beam B10 to the two light fluxes of which polarized directions are orthogonal to each other, and then the quarter wavelength plate 15 converts each of the two light fluxes to the circular polarized light of which polarized direction is opposite to that of the light which has yet to be converted. Then the reflection of the circular polarized light fluxes on the face of the disk causes each light flux to be changed to circular polarized light whose polarized direction is reversed. Hence, in the backward optical path, the light fluxes are forced to pass regions which are point symmetry to those in the forward optical path. Then, the quarter wavelength plate 15 converts again to the linear polarized light fluxes which are the same to those in the forward optical path. Therefore, while the incident optical beam B10 can be handled as a whole to produce a circular-polarized optical spot on the disk, the single polarization-dependent element (i.e., the liquid crystal panel 14) can give phase differences to the light fluxes in both the forward and backward optical paths. Accordingly, unlike the conventional, there is no necessity of using two polarization-dependent elements dedicated respectively to both of the forward and backward optical paths. The number of parts can be reduced, thus saving a production cost of the optical pickup.

Though the present invention has used the liquid crystal panel as the polarization-dependent element, this is just an example. A polarizing hologram lens can be used in place of the liquid crystal panel.

Figure 8A:
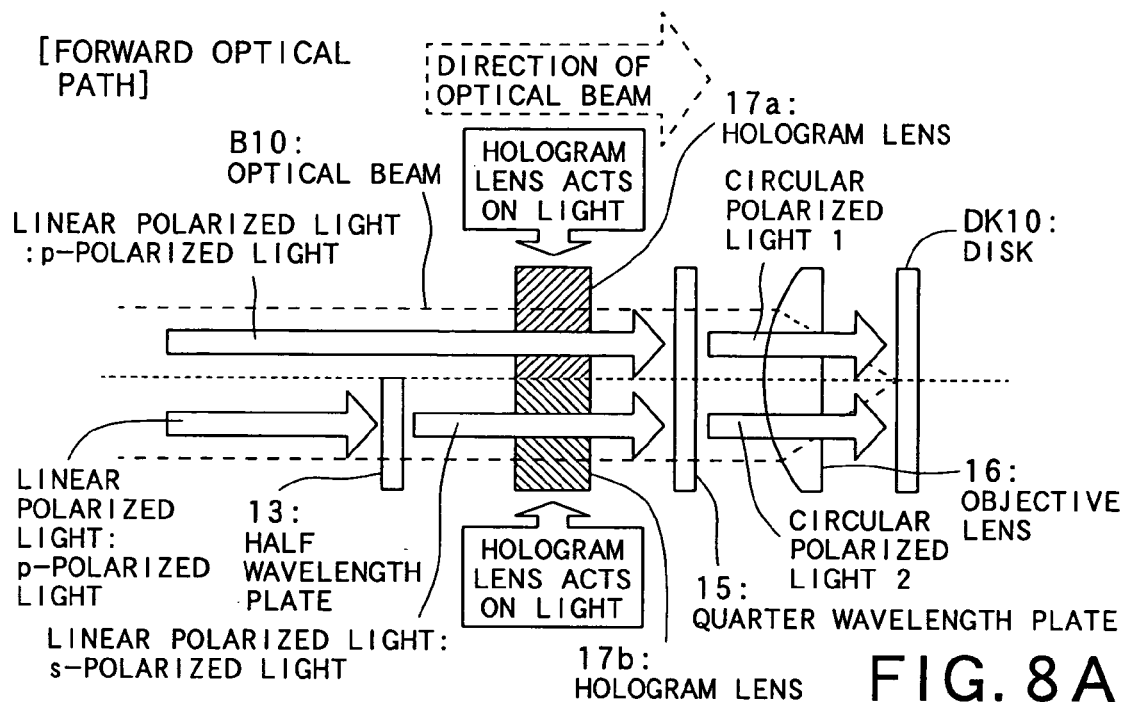
FIGS. 8A to 8C illustrate the operations of an optical pickup according to a modification of the first embodiment.
Figure 8B:
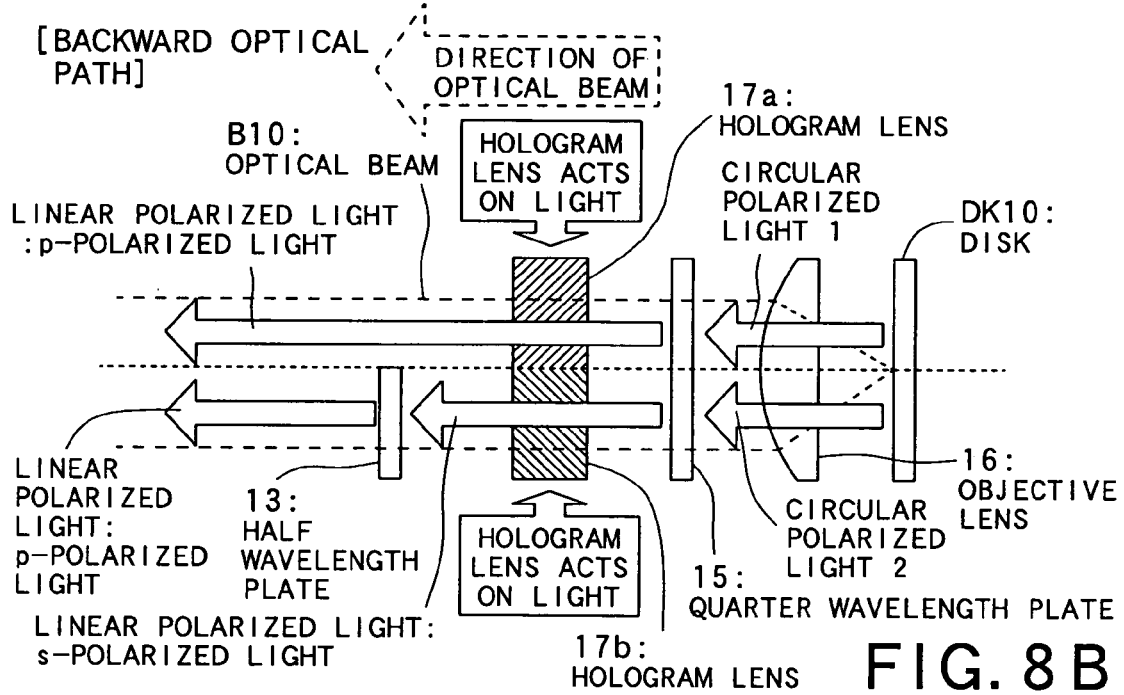

FIGS. 8A and 8B exemplify a modification of the above optical pickup, in which a hologram lens 17 is used as the polarization-dependent element, instead of the liquid crystal panel 14.

Figure 8C:
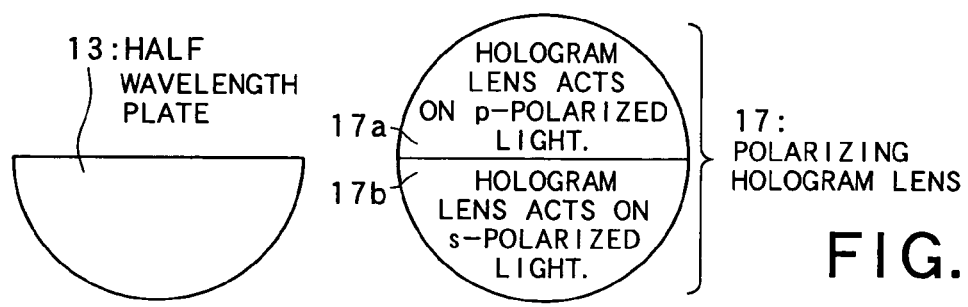

The polarization dependency of the hologram lens 17 is illustrated in FIG. 8C, where, in the similar way to that shown in FIG. 7C, the single hologram lens 17 is produced to have two semicircular hologram regions 17a and 17b whose shapes correspond to that of the half wavelength panel 13. One hologram region 17a is formed to act on p-polarized light and the other hologram region 17b is formed to act on s-polarized light. This configuration is able to the identical advantages to those explained in the first embodiment.

In the present embodiment and its modification, the half wavelength plate 13 can be modified into other various forms, not limited to the configuration stated above. For example, the half wavelength plate can be formed such that an optical beam is equally divided into even-numbered regions which are point-symmetry about the optical axis. Such division of the optical beam on the point-symmetry and even-numbered-region basis is required, because the light fluxes composing the optical beam should be returned to respective point-symmetry regions after its reflection on an optical disk. Further, depending on the shape of this half wavelength plate, the polarizing hologram lens (also, the liquid crystal panel stated before) is designed to have the polarization-dependent characteristics that act on optical beams passing the respective regions.

In the present embodiment and its modification, the aberration to be targeted for the correction performed by the liquid crystal panel or hologram lens includes a wavefront aberration attributable to an error of the thickness of a disk, a coma aberration of an objective lens, and a spherical aberration of the objective lens.

Applications of the optical pickup according to the present embodiment and its modification are not limited to the above. Such an optical pickup can be applied to the information recording mediums other than the medium requiring an optical beam to enter the substrate side thereof.

The wavelength λ of the optical beam to be radiated from the light emission/reception element 11 (laser source) will not particularly be limited to 650 nm stated above.

(Second Embodiment)

A second embodiment will now be explained, where the present invention is applied to a compatible type of optical pickup in which the recording and reproduction of information is carried out by radiating mutually different wavelengths of optical beams toward a DVD and a high-density optical disk, which serve as information recording mediums.

Such information recording mediums are a disk DK10 serving as a first format disk, which is composed of the DVD explained in the foregoing first embodiment, and a further disk DK20 serving as a second format disk, which is composed of a high-density optical disk. The disk DK20 is provided with a substrate on which formed is a recording layer in which information signals are recorded with phase changes. On the recording layer, a cover layer whose thickness is for example. 0.1 mm is formed to function as a protective layer to the recording layer. In this disk DK20, recording and reproducing bits of information is carried out by radiating an optical beam to the cover layer side thereof, not to the substrate side thereof, because the cover layer is noticeably thinner than the substrate so that a distance to the recording layer becomes shorter compared to that to the recording layer from the substrate side.

Radiating the optical beam to the cover layer side suppresses the occurrence of the aberration, making it possible to enhance high-density recording and large-capacity storage.

Figure 9:
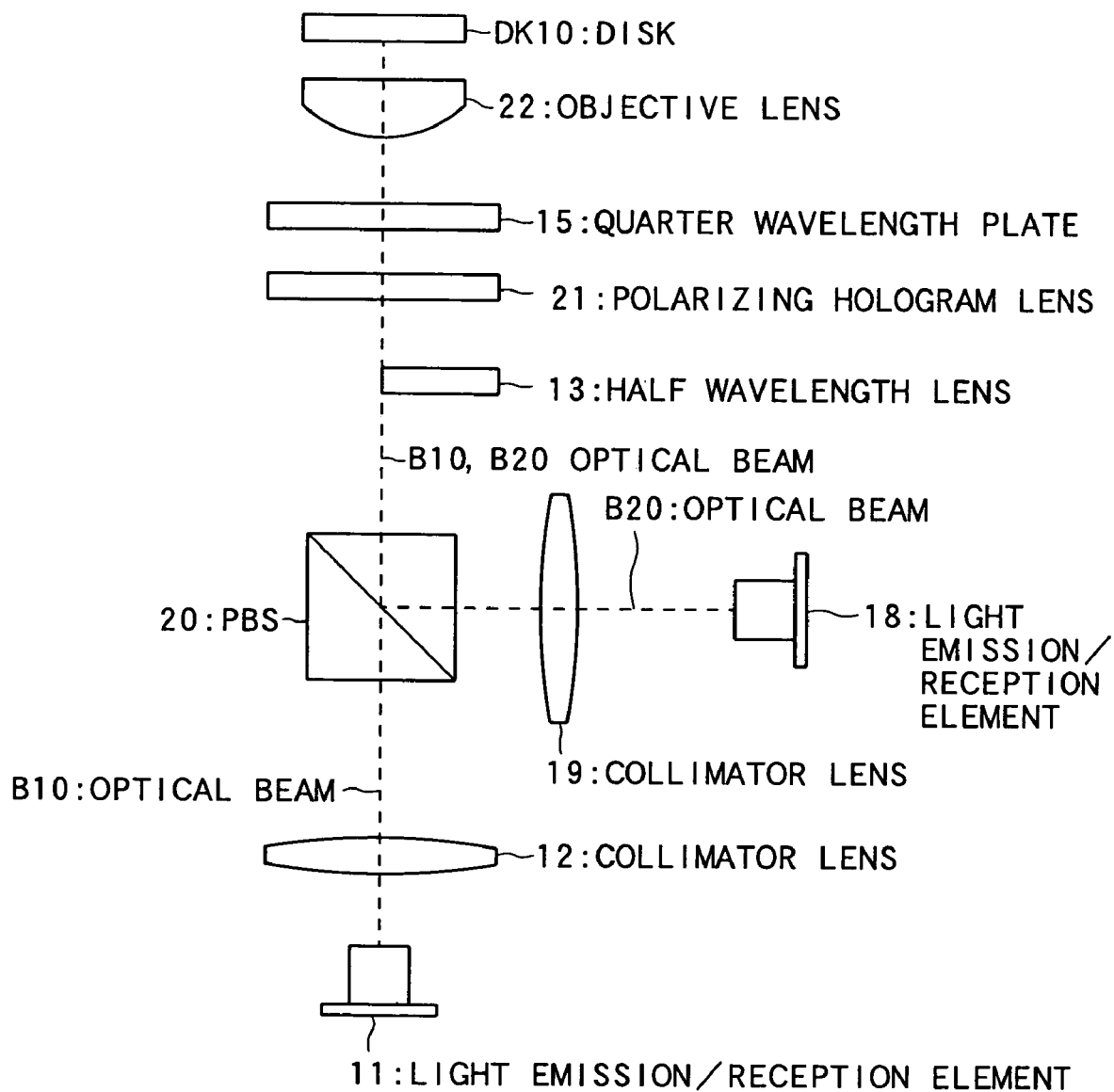
FIG. 9 shows the optical configuration of an optical pickup according to a second embodiment of the present invention.

In FIG. 9, there is provided an optical pickup according to the second embodiment. This optical pickup is equipped with a light emission/reception element 11, collimator lens 12, half wavelength plate 13, polarizing hologram lens 21 serving as a compatible element, quarter wavelength plate 15, objective lens 22, light emission/reception element 18, collimator lens 19, and polarizing beam splitter (PBS) 20.

Of these components, the light emission/reception element 11, collimator lens 12, half wavelength plate 13, and quarter wavelength plate 15 are the same as those explained in FIG. 6 according to the first embodiment.

The objective lens 22 is an objective lens for the disk DK20, but can be used as a compatible lens by using the polarizing hologram lens 21 as a compatible element, in the case that the disk DK 10 is subjected to recording and reproduction of bits of information.

As described in the first embodiment, both the light emission/reception element 11 and the collimator lens 12 are used for recording and reproduction of bits of information on and from the disk DK10. A p-polarized optical beam B10 radiated by the light emission/reception element 11 enters the collimator lens 12, where the optical beam B10 is converted to parallel light. The parallel light is then enters the polarizing beam splitter 20.

On the other hand, the other light emission/reception element 18 and the other collimator lens 19 are used for recording and reproduction of bits of information on and from the disk DK20. The light emission/reception element 18 serving as a light source is configured to emit an s-polarized optical beam B20 serving as an orthogonal optical beam of which color is blue and of which wavelength λ is 405 nm, for example. This optical beam B20 radiated from the light emission/reception element 18 enters the collimator lens 19 to be converted to parallel light, before entering the polarizing beam splitter 20.

The polarizing beam splitter 20 allows the p-polarized light flux to pass therethrough but reflects the s-polarized light flux. That is, when the information recording and reproduction is performed with the disk DK10, the optical beam B10 is able to get through the polarizing beam splitter 20, because the optical beam B10 is the p-polarized light. The optical beam B10 then enters the half wavelength plate 13. In contrast, when the information recording and reproduction is performed with the disk DK20, the optical beam B20 is reflected by the polarizing beam splitter 20, because the optical beam B20 is the s-polarized light. The reflected optical beam B20 then enters the half wavelength plate 13.

Figure 10A:
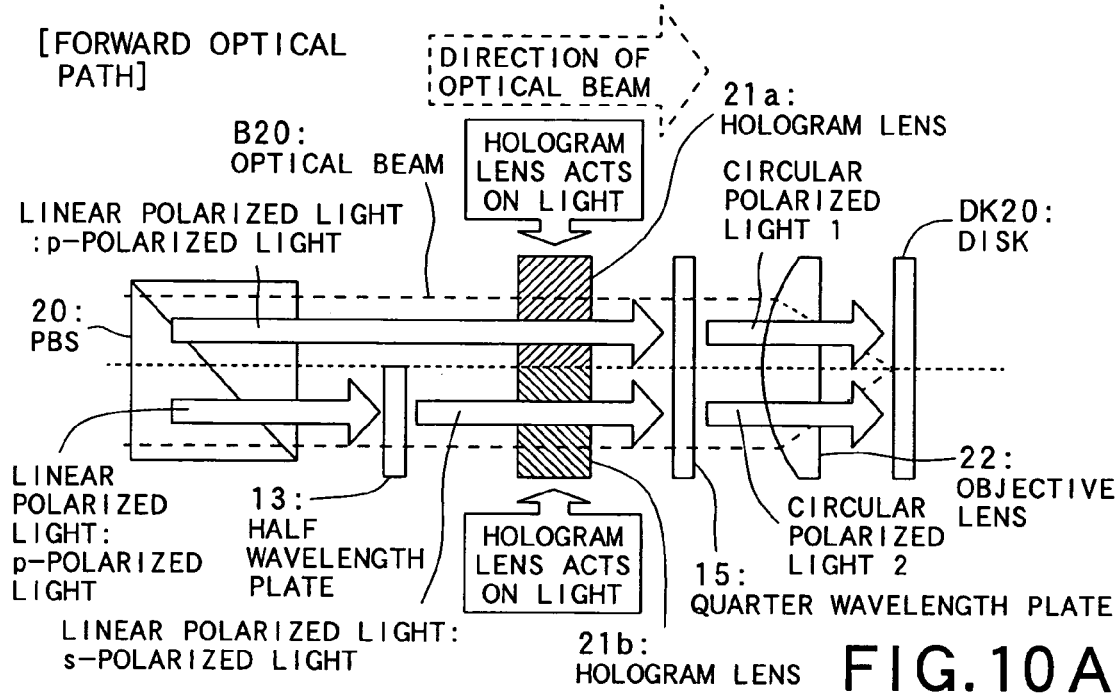
FIGS. 10A to 10C illustrate the operations of the optical pickup in the second embodiment.
Figure 10B:
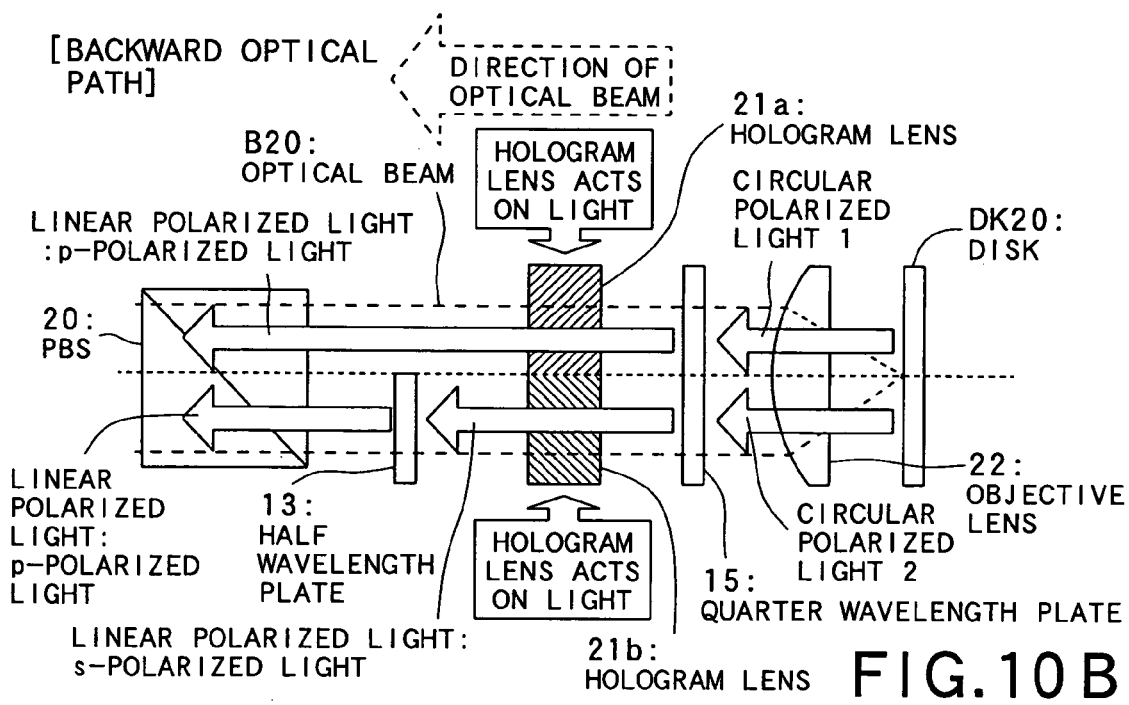

Using FIGS. 10A to 10C, the information recording and reproduction on and from the disk DK10 will now be explained at first.

The p-polarized optical beam B10, which has passed through the polarizing beam splitter 20, comes in the half wavelength plate. As stated before, a semicircle-portion light flux of the optical beam B10 is converted to an s-polarized optical beam by the half wavelength plate 13, while the remaining semicircle-portion light flux of the optical beam B10 travels without passing the half wavelength plate 13, thus being kept to the p-polarized light. The respective optical beams then enter the polarizing hologram lens 21.

Figure 10C:
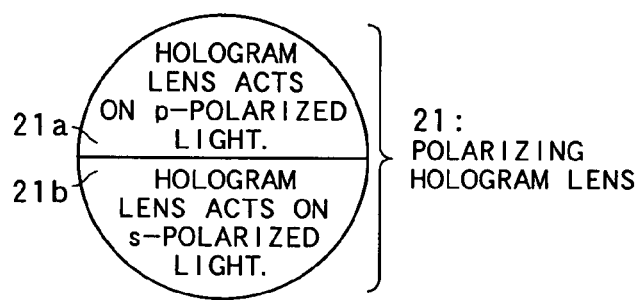

The polarizing hologram lens 21 is, as shown in FIG. 10C, composed of two polarizing hologram regions 21a and 21b each shape of which corresponds to the shape of the half wavelength plate 13. As shown in FIG. 10C, one polarizing hologram region 21*a* is designed to act on the p-polarized light, while the remaining polarizing hologram region 21*b* is designed to act on the s-polarized light, which is orthogonal in the polarizing direction to the p-polarized light.

Of the optical beam B10 that has come to the polarizing hologram lens 21, the p-polarized light flux entering the polarizing hologram region 21*a* undergoes an action of the region 21*a*. Likewise, the s-polarized light flux entering the polarizing hologram region 21*b* undergoes an action of the region 21*b*.

The reflection of the optical beam B10 by the disk DK10 and a backward travel of the p-polarized light flux to the polarizing beam splitter 20 are the same as those explained in the first embodiment. Their detailed explanations will thus be omitted.

In the backward optical path, the optical beam B10 composed of the p-polarized light flux is allowed to get through the polarizing beam splitter 20. This optical beam B10 then passes through the collimator lens 12, and then reaches the light emission/reception element 11 so that an image is focused onto a not-shown detector of the element 11.

Figure 11A:
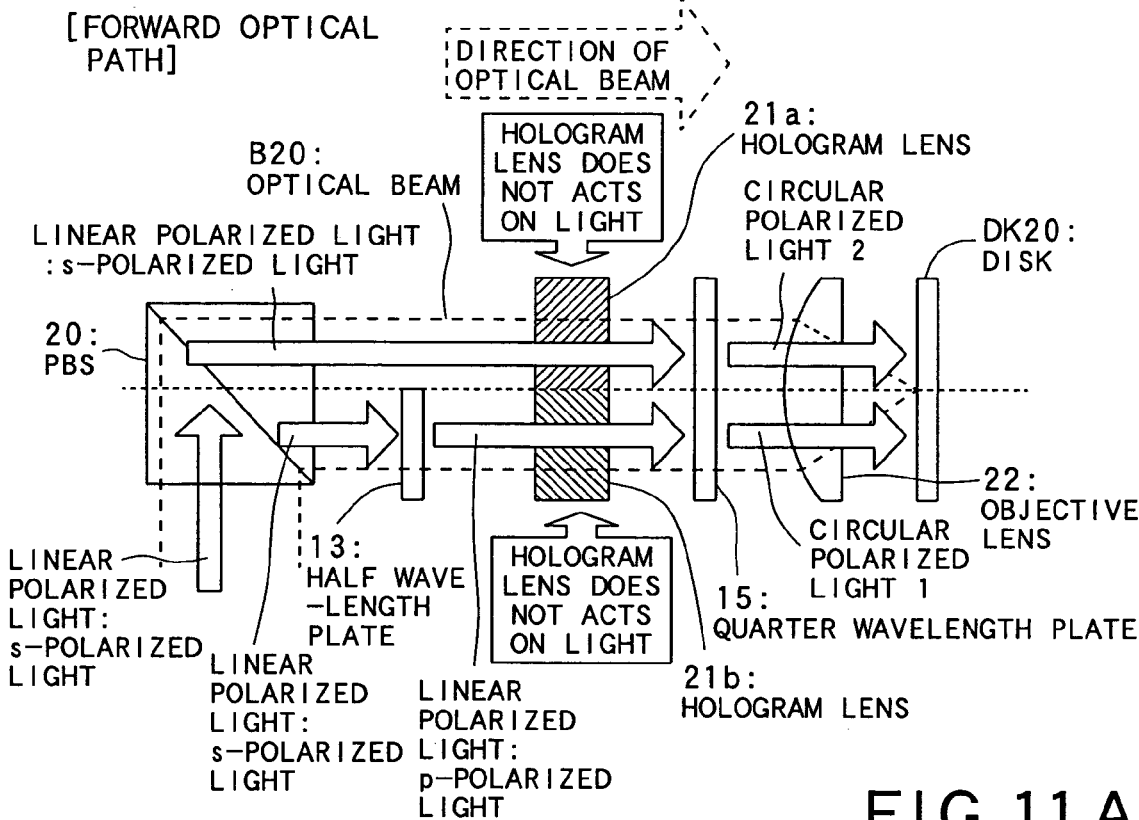
Figure 11B:
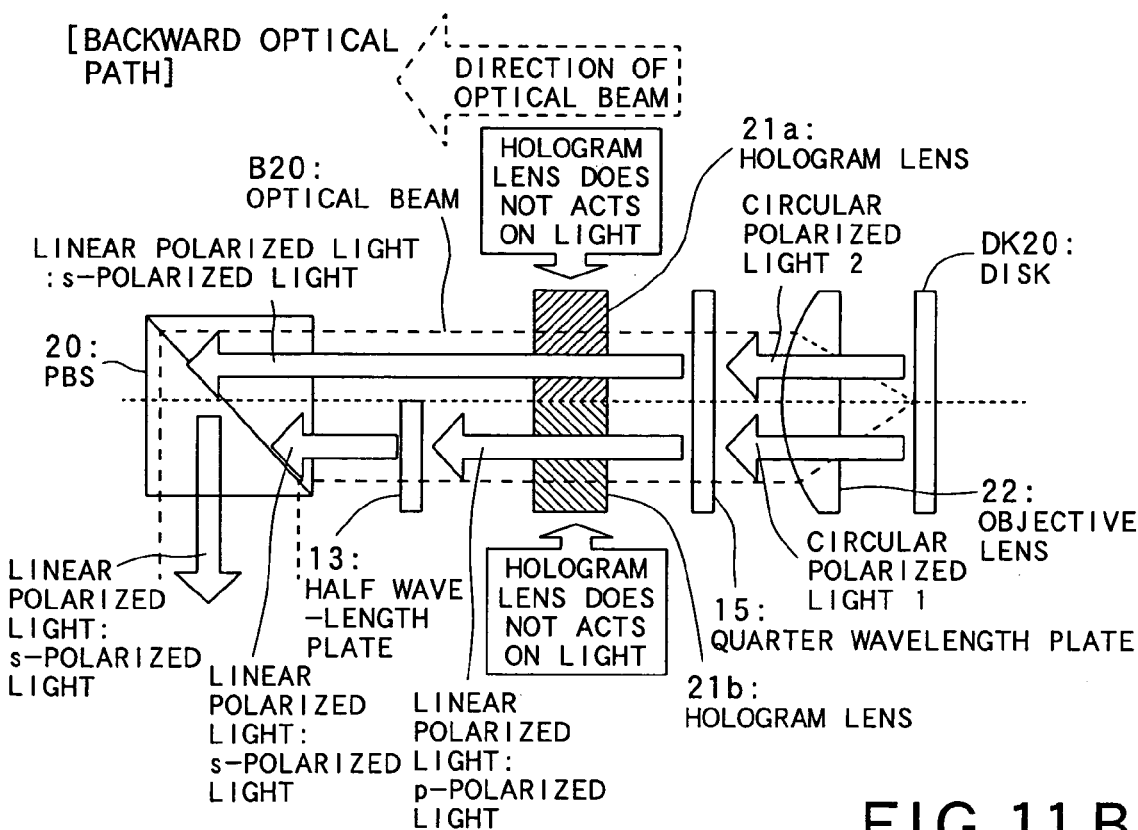

Using FIGS. 11A and 11B, the information recording and reproduction on and from the disk DK20 will now be explained at first.

After having reflected by the polarizing beam splitter 20, the s-polarized optical beam B20 comes in the half wavelength plate 13. By this plate 13, a semicircle-portion light flux of the optical beam B20 is transformed to p-polarized light. However, the remaining semicircle-portion light flux of the optical beam B20 does not get through the half wavelength plate 13, so that the light remains the s-polarized light. The respective light fluxes then enters the polarizing hologram lens 21.

In the polarizing hologram lens 21, as described before, the design is made such that one polarizing hologram region 21*a* acts on the p-polarized light, while the other polarizing hologram region 21*b* acts on the s-polarized light.

Hence, of the optical beam B20 that has come in the polarizing hologram lens 21, the s-polarized light flux entering one polarizing hologram region 21*a* will not be subjected to the action of the region 21*a*. Similarly to this, the p-polarized light flux entering the remaining polarizing hologram region 21*b* will not be subjected to the action of the region 21*b*.

After a travel through the polarizing hologram lens 21, the optical beam B20 passes through the quarter wavelength plate 15.

The quarter wavelength plate 15 converts the optical beam B20 into circular polarized light fluxes "2" and "1," which are then made to enter the objective lens 22. After getting through the objective lens 22, the light fluxes are focused onto an information recording area of the face of the disk DK20.

When being reflected by the disk DK20, the light fluxes composing the optical beam B20 change their rotational directions, respectively. In other words, the light flux on the circular polarization "2" is converted to the circular polarized light flux "1," while the light flux on the circular polarization "1" is converted to the circular polarized light flux "2." In addition, the reflection is done such that the light fluxes of the optical beam B20 are reflected to point-symmetry regions about at an optical axis of the optical beam B20, which traveled through the point-symmetry regions in the forward optical path. Hence the polarizing directions of the optical beams across the quarter wavelength plate 15 in the forward and backward optical paths become the same.

Passing of the optical beam B20 through the quarter wavelength plate 15 enables not only the light flux on the circular polarization "2" to change into an s-polarized light flux but also the light flux on the circular polarization "1" to change into a p-polarized light flux.

The s-polarized light flux enters the polarizing hologram region 21*a*, while the p-polarized light flux enters the polarizing hologram region 21*b*. In consequence, the optical beam B20 composed of the light fluxes whose polarizing directions are different from each other will not be subjected to the actions of such polarizing hologram regions 21*a* and 21*b* even in the backward optical path.

The p-polarized light flux that has got through the one polarizing hologram region 21*b* comes in the half wavelength plate 13 to become an s-polarized light flux. It is therefore possible that the optical beam B20, whose polarized light fluxes have been different from each other in their polarized states until that moment, is all unified to the s-polarized light flux at this final optical stage. This unified s-polarized light is reflected by the polarizing beam splitter 20, and then made to pass through the collimator lens 19, whereby the light is focused onto a not-shown detector of the light emission/reception element 18.

As described above, there is provided the configuration where the polarizing hologram lens is used as the compatible element to establish the recording and reproduction of information toward both the DVD and the high-density optical disk in the same optical system. In this system, when the polarizing hologram lens is desired not to be operative, light fluxes whose polarizing directions are different by 90 degrees from those in the above second embodiment are made to enter the polarizing hologram lens. This creates a polarized state inconsistent with the polarization-dependent characteristics of the polarizing hologram lens, so that this lens will not act on the light fluxes. Therefore, depending on the incident polarizing directions, the action of the polarizing hologram lens can be on or off, thus providing a compatible lens.

Additionally, since the circular polarized light is produced on the disk face, it is avoidable that the recording and reproduction characteristic is largely dependent on the disk structures or others. A preferable playability can therefore be obtained.

Furthermore, with the circular polarized light produced on the disk face, the polarizing hologram lens can act even in the backward optical path, in the case that such hologram lens is adopted as the compatible element. It is possible to steadily remove an aberration in the backward optical path, whereby no huge amount of aberration is left in the detecting optical system.

A modification is as follows. The optical pickup according to the second embodiment can be produced as a compatible pickup directed to an information recording medium, in which an optical beam comes in the medium from its cover layer side, not the substrate side, for the information recording and reproduction.

The entire disclosure of Japanese Patent Application No. 2002-334689 filed on Nov. 19, 2002 including the specification, claims, drawings and summary is incorporated herein by reference in its entirety.

What is claimed is:

1. An optical pickup for performing at least one of recording and reproduction of bits of information onto and from an information recording medium by using a single polarized optical beam having a single polarizing direction, comprising:

a polarization converting unit configured to convert the single polarized optical beam to plural polarized optical beams having a plurality of polarizing directions;

a converting and radiating unit configured to convert polarization modes of the plural polarized optical beams to a polarization mode suitable for one of the recording and the reproduction to produce polarization-converted optical beams, every polarizing direction, and to radiate the polarization-converted optical beams to the information recording medium;

a mode returning unit configured to return polarization modes of the polarization-converted optical beams reflected from the information recording medium, to the same polarization mode as that of the plural polarized optical beams and to produce plural polarized reflected optical beams; and a polarization returning unit configured to return polarization modes of the plural polarized reflected optical beams to the same polarization mode as the single polarized optical mode.

2. The optical pickup according to claim 1, wherein the polarization mode of the single polarized optical beam is a linear polarization having a predetermined direction, the polarization converting unit includes a division converting unit configured to have the plural polarized optical beams by dividing the single polarized optical beam spatial-equally into even-numbered portions of the beam that are point-symmetry about an optical axis of the single polarized optical beam, polarization modes of the divided portions consisting of a first portion having a first linear polarized light flux and a second portion having a second linear polarized light flux orthogonal in a polarizing direction to the first linear polarized light flux, the first and second portions being adjacent to each other, the converting and radiating unit is configured to convert the polarization modes of the plural polarized optical beam so that the first linear polarized light flux is converted to a first circular polarized light flux and the second linear polarized light flux is converted to a second circular polarized light flux, the mode returning unit is configured to handle polarization modes of the reflection light of the plural polarized optical beam so that the first circular polarized light flux is converted to the first linear polarized light flux and the second circular polarized light flux is converted to the second linear polarized light flux, thereby producing the plural polarized reflected optical beams, and the polarization returning unit is configured to convert the polarization modes of the plural polarized reflected optical beams to the linear polarization having the predetermined direction.

3. The optical pickup according to claim 1, which is applied to a compatible optical pickup usable for at least one of recording and reproduction of bits of information on and from a first format disk and a second format disk, the compatible optical pickup comprising:

a first emission unit configured to emit the single polarized optical beam on the linear polarization having the predetermined direction when the first format disk is subjected to at least one of the recording and the reproduction; and a second emission unit configured to emit an orthogonal optical beam whose polarizing direction is orthogonal to the single polarized optical beam on the linear polarization having the predetermined direction when the second format disk is subjected to at least one of the recording and the reproduction, wherein the polarization converting unit is configured to convert a polarization mode of the first portion of the orthogonal optical beam to the second linear polarized light flux and to convert a polarization mode of the second portion of the orthogonal optical beam to the first linear polarized light flux.

4. The optical pickup according to claim 1, further comprising a polarization acting unit configured to have a region consisting of a first region through which the first portion of the plural polarized optical beams passes and a second region through which the second portion of the plural polarized optical beams passes, the first region having a polarization-dependent characteristic acting on the first linear polarized light flux and the second region having a polarization-dependent characteristic acting on the second linear polarized light flux.

5. The optical pickup according to claim 2, wherein the division converting unit is composed of a half wavelength plate.

6. The optical pickup according to claim 1, wherein the polarization converting unit is provided with a quarter wavelength plate.

7. The optical pickup according to claim 4, wherein the polarization acting unit is configured to act as an aberration collecting element.

8. The optical pickup according to claim 4, wherein the polarization acting unit is composed of a polarizing hologram lens.

9. The optical pickup according to claim 4, wherein the polarization acting unit is composed of a liquid crystal panel.

10. The optical pickup according to claim 4, wherein the polarization acting unit is configured to function as a compatible element used for at least one of the recording and the reproduction of the first format disk, to an objective lens used for at least one of the recording and the reproduction of the second format disk.

11. The optical pickup according to claim 3, wherein the single polarized optical beam is formed by red light and the orthogonal optical beam is formed by blue light.

* * * * *